UNITED STATES PATENT OFFICE 2,624,766

TRIDECENYL ALCOHOLS

John Mann Butler, Dayton, Ohio, assignor to Monsanto Chemical Company, St. Louis, Mo., a corporation of Delaware No Drawing. Application October 15, 1949, Serial No. 121,645

5 Claims. (Cl. 260—615)

This invention provides an unsaturated alcohol having 13 carbon atoms in the molecule. The present alcohols are useful for the production of detergents of the sulfated alcohol type and also for the production of detergents of the non-ionic type by condensation with ethylene oxide or propylene oxide.

It is known that triisobutylene contains an appreciable proportion of the olefins 2,2,4,6,6-pentamethyl heptene-3:

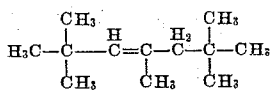

and unsym. dineopentyl ethylene:

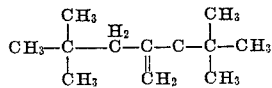

I have found that by reacting formaldehyde or para-formaldehyde, or, in fact, any formaldehyde-yielding substance with the above olefin, an unsaturated tridecenyl alcohol having the formula:

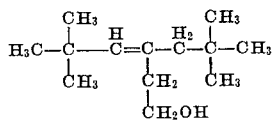

is obtained.

This alcohol may be sulfated by treatment with sulfuric acid resulting in the formation of unsaturated sulfuric esters having the formula:

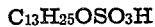

These esters may be converted to the corresponding alkali metal salts of which the sodium, potassium or ammonium salts are preferred. Alternatively the alcohol may be hydrogenated with the formation of the corresponding saturated alcohol:

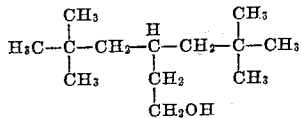

It may likewise be converted to the saturated sulfuric ester

also readily converted to the corresponding alkali metal salts.

The above alcohols may likewise be converted to the corresponding esters by esterification with mono- or dibasic organic acids, such as for example, acetic, propionic, butyric, maleic, succinic or phthalic acids.

My new, unsaturated tridecenyl alcohol may be produced by the reaction described in U. S. Patent 2,335,027, whereby formaldehyde is reacted with diisobutylene, leading to the formation of diisobutenyl carbinol, these being unsaturated alcohols containing 9 carbon atoms. Temperature of from 260° C. to 350° C. may be employed.

According to my present invention the new tridecenyl alcohols herein-described may be converted into new surface-active agents which are of greater activity than the corresponding nonenyl alcohols derived from diisobutylene.

The present invention is illustrated by the following examples:

EXAMPLE 1

336 g. (2.0 moles) of triisobutylene boiling over the range of from 173° C.–175° C. and 63.5 g. (2 moles) of paraformaldehyde are charged into a heated rotary autoclave. The autoclave contents are then heated to a temperature of from 300° C. to 310° C. for 20 hours. The pressure developed was about 150 pounds gauge. The autoclave was then cooled, the reaction product removed and subjected to fractional distillation. The fraction boiling over the range 110° C. to 130° C. at 12 mm. Hg pressure was collected. The product had a refractive index of $n_D^{25}=1.4492$.

EXAMPLE 2

39.6 g. of the triisobutenyl carbinol, prepared in Example 1 above, and 0.25 g. KOH was placed in a flask equipped with a gas disperser and stirrer and connected with a source of ethylene oxide. Ethylene oxide gas was passed into the alcohol while at a temperature of about 125° C. until 132 g. of ethylene oxide had condensed with the alcohol. The polyethylene glycol ethers so formed contained the equivalent of 15 moles of condensed ethylene oxide.

The amount of ethylene oxide condensed with the present alcohol may be varied over the range of from 5 to 20 moles by a procedure such as that described above.

The surface activity possessed by the above products was determined by means of the standard detergency tests described by Jay C. Harris in Soap and Sanitary Chemicals for August and September, 1943. The results obtained are given in the tabulation below, wherein the detergency is expressed as percent of the detergency exhibited by a standard sample of lauryl sulfate, the detergency of which is taken as 100%:

*Detergency per cent of lauryl sulfate*

|  | As Recd. (100% Active) | | Built (20% Active) | |
|---|---|---|---|---|
| Water hardness _____ p. p. m__ | 50 | 300 | 50 | 300 |
| Product of Ex. 2 _____ | 109 | 107 | 107 | 110 |

The product produced in Example 2 above was also tested for speed of wetting, employing the standard canvas disc wetting test. This test was applied to a water solution containing 0.5% concentration of the product of Example 2 above. So tested it was found to possess a wetting speed of 3.9 seconds.

The surface-active properties of the present condensation products indicated above, are utilized advantageously in any process involving the treatment of textile materials with aqueous solutions where it is desired to obtain rapid and efficient penetration and/or cleaning thereof. For this purpose the aqueous solutions should contain from 0.05% to 1.04% by weight of said condensation product.

When used as a detergent, the herein-disclosed condensation products may be employed either in the 100% active form of they may be combined with alkali metal salt builders, such as alkali metal phosphates, sulfates, carbonates, silicates or with carbohydrate materials such as starch, carboxymethyl cellulose, etc., or mixtures of these materials. When employed with builder salts they are utilized in an amount varying from about 10% to 50% or more by weight of active material in the built composition. Suitable alkali metal salts utilizable in these compositions are the disodium orthophosphate, trisodium orthophosphate, tetrasodium pyrophosphate, sodium metaphosphate, sodium tripolyphosphate, sodium carbonate, sodium bicarbonate, sodium sesquicarbonate, sodium silicates, etc. A built composition suitable for general detergent purposes may contain the following ingredients in parts by weight:

|  | Parts |
|---|---|
| Product of Ex. 2 | 20.0 |
| Tetrasodium pyrophosphate | 40.0 |
| Starch | 38.5 |
| Carboxymethyl cellulose | 1.5 |
| Total | 100.0 |

What I claim is:

1. Triisobutenyl carbinol.
2. The process which comprises reacting ethylene oxide with triisobutenyl carbinol at a temperature of about 125° C. and in the presence of a basic catalyst.
3. The process which comprises reacting ethylene oxide with triisobutenyl carbinol at a temperature of about 125° C. and in the presence of a basic catalyst until at least 5 moles but not in excess of 20 moles of ethylene oxide have condensed per mole of said carbinol.
4. The polyethylene glycol ethers of triisobutenyl carbinol.
5. The polyethylene glycol ethers of triisobutenyl carbinol, said ethers containing at least 5 but not in excess of 20 moles of condensed ethylene glycol.

JOHN MANN BUTLER.

REFERENCES CITED

The following references are of record in the file of this patent:

UNITED STATES PATENTS

| Number | Name | Date |
|---|---|---|
| 1,696,874 | Young | Dec. 25, 1928 |
| 1,970,578 | Schoeller et al. | Aug. 21, 1934 |
| 2,133,480 | Schoeller et al. | Oct. 18, 1938 |
| 2,164,431 | Schoeller et al. | July 4, 1939 |
| 2,226,119 | De Groote et al. | Dec. 24, 1940 |
| 2,355,823 | Schlegel | Aug. 15, 1949 |
| 2,527,970 | Sokol | Oct. 31, 1950 |